United States Patent [19]
Totzke et al.

[11] Patent Number: 5,680,399
[45] Date of Patent: Oct. 21, 1997

[54] METHOD AND CIRCUIT ARRANGEMENT FOR CONTROLLING A CALL SETUP FOR INTERACTIVE SERVICES

[75] Inventors: Juergen Totzke, Poing; Gernot Von Der Straten, Tutzing, both of Germany

[73] Assignee: Siemens Aktiengesellschaft, Munich, Germany

[21] Appl. No.: 519,147

[22] Filed: Aug. 24, 1995

[30] Foreign Application Priority Data

Aug. 24, 1994 [DE] Germany .............. 44 30 051.4

[51] Int. Cl.⁶ .................................................. H04N 7/173
[52] U.S. Cl. .................................. 370/468; 348/13
[58] Field of Search .................... 370/58.1, 58.2, 370/60, 60.1, 62, 68.1, 94.1, 94.2, 110.1, 259, 395, 468, 922; 348/7, 13, 16

[56] References Cited

U.S. PATENT DOCUMENTS

| 5,509,010 | 4/1996 | La Porta et al. | 370/68.1 |
| 5,541,917 | 7/1996 | Farris | 370/68.1 |

OTHER PUBLICATIONS

Daniel Deloddere et al., "Interactive Video On Demand", IEEE Communications Magazine, May 1994, pp. 82–88.

Primary Examiner—Melvin Marcelo
Attorney, Agent, or Firm—Hill, Steadman & Simpson

[57] ABSTRACT

What are referred to as set top boxes are employed for controlling interactive video services. In order to select and view video films stored in the network, a call set up to the appertaining memory device is automatically controlled from the set top box with the assistance of a standardized signalling method.

10 Claims, 2 Drawing Sheets

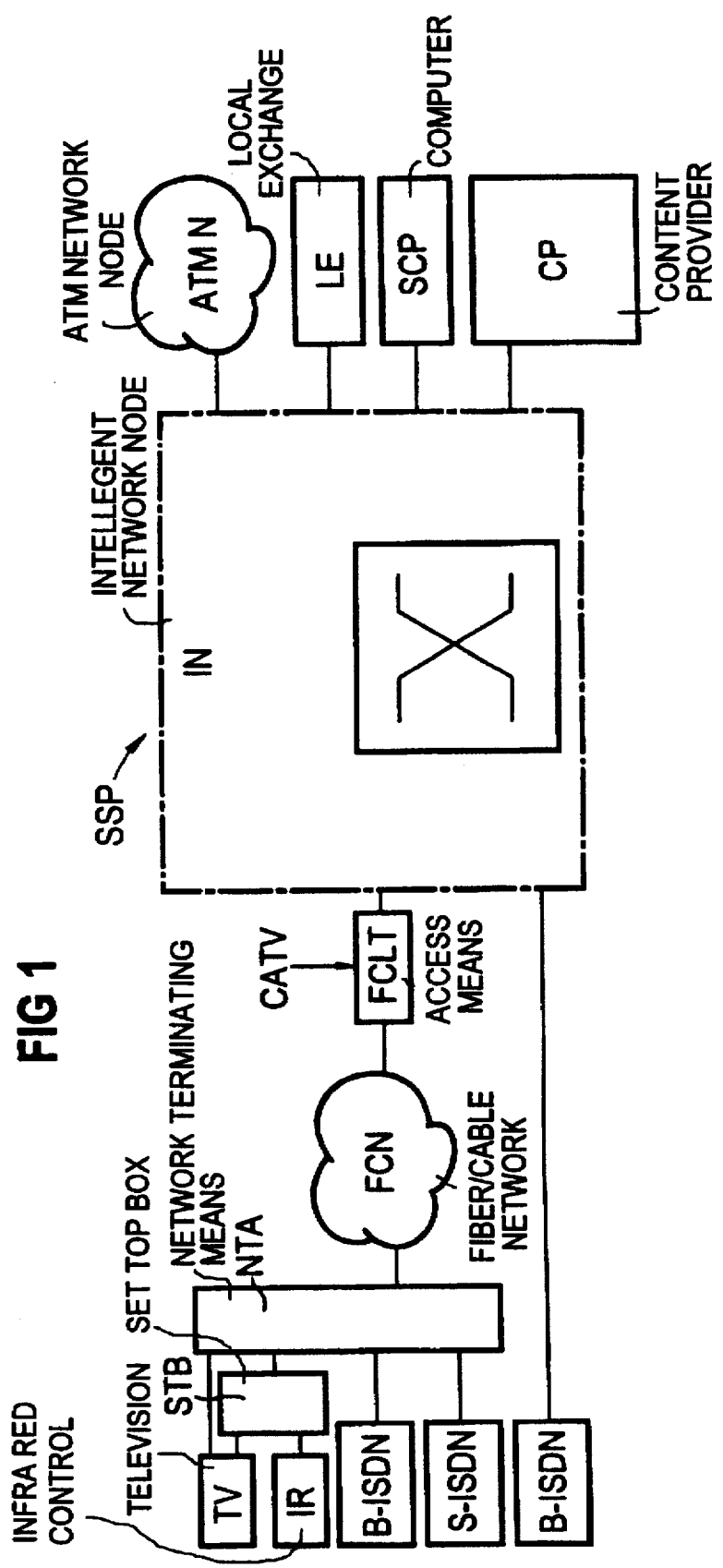

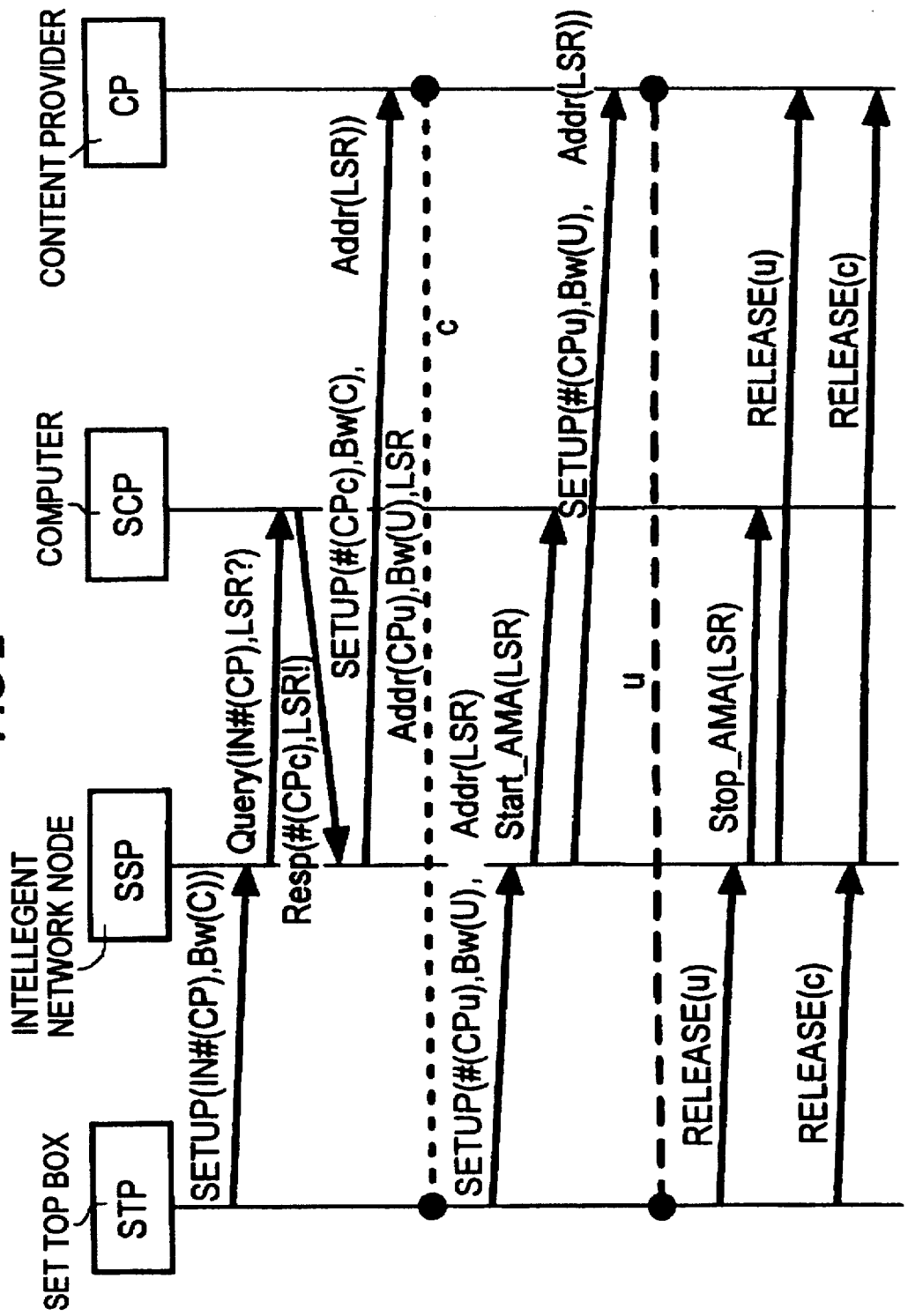

METHOD AND CIRCUIT ARRANGEMENT FOR CONTROLLING A CALL SETUP FOR INTERACTIVE SERVICES

BACKGROUND OF THE INVENTION

1. Field of the Invention

The invention is directed to a method for connection control for interactive services that include a plurality of control devices, each of which is allocated to a terminal equipment, and a network node that serves for through connection of information and to which a plurality of control devices and at least one memory device is connected, and via which information is conducted from the memory device to one of the control devices and vice versa using an existing connection.

2. Description of the Related Art

Services that integrate a plurality of media such as, for example, audio, video and data, and allow the subscriber interactions are currently subsumed under the collective term MULTIMEDIA services. This includes specific services such as, for example, HOME SHOPPING, VIDEO ON DEMAND or DISTANT LEARNING that can be used from terminal equipment installed at the subscriber location. It is obvious to employ television sets as the terminal equipment since, first, great numbers of television sets are already present at subscriber locations and, second, televisions offer the subscriber the possibility of conducting a dialogue with the purveyor of the service either optically or acoustically.

To this end, specific control devices are utilized for handling these operations. These control devices are referred to as set top boxes and are connected to a television set as auxiliary equipment. As a rule, the control devices are inserted into the signal link supplied to the television set. Simple set top boxes are used to decode additional television channels, such as for example pay TV channels, and to display the corresponding information on the picture screen of the television set. Set top boxes which have greater performance capability can be interactively driven by the subscriber with a remote control to utilize the aforementioned special services. The technological trend is toward higher and higher capacity and low cost memories which has led to making, in particular, the call-in of video films (VIDEO ON DEMAND) technological feasible so that this service is being increasingly offered by the service providers, such as cable television providers. Video films are stored in compressed form in large digital memory devices (also referred to as video servers) that function as a content provider from the point of view of the subscriber.

Up to now, such interactive services have only been offered in field trials in the U.S.A. In such field trial, a connection is set up between one of the set top boxes and the video server that contains the desired video film. The connection is hardwired via cross-connector devices (also termed "nailed-up connections", which refer to connections that are preset by network management). The desired information (for example, a video film) are then supplied to the subscriber via the nailed-up connection and are shown on the television set. The corresponding conditions are addressed in a publication by Deloddere, et al. in IEEE Communications Magazine, May 1994, entitled "Interactive Video On Demand".

A problem with the existing system, however, is that the connection can only be set up with a certain time delay since the corresponding settings in response to a message from the subscriber must ensue in all network nodes participating in the connection via a central network management system. When, for example, the subscriber would like to watch a different film while watching one video film, this different film being stored in a different content provider, then the re-addressing connected therewith can only be undertaken during the timespan that was just mentioned. Moreover, the procedure disclosed by the prior art, wherein nailed-up connections are connected, uses network resources up to the selection computer (Level 1 Gateway) for the content provider.

SUMMARY OF THE INVENTION

An object of the present invention is to provide a method for call setup for interactive video services with which the call set up can be quickly and efficiently implemented.

The method for connection control for interactive services provides the steps of: automatically setting up at least one connection from one of the control devices to the memory device using a standardized real time delivery method; and exchanging information over the at least one connection for the duration of its existence.

An advantage of the invention is that, based on the criterion of an externally supplied control signal, a call setup to the desired memory means is automatically controlled by one of the control devices with the assistance of a standardized real-time signalling method. This provides the advantage that the desired connection is set up immediately under real-time conditions. A further advantage is that the connection exists only during the transmission of the desired information and is subsequently cleared down, so that a possible overload of the system is avoided. Moreover, the required connections hops are offered link-by-link, as a result of which the alternate circuits usually realized in networks can be automatically co-utilized should network or line faults arise. Moreover, the network resources are only occupied up to the first network node since the signalling connection is already terminated by the present method by the control device.

Further developments of the invention are provided wherein the information being exchanged in the exchanging step is control information. Alternately, the information being transmitted in the exchanging step is useful information. The method optionally provides for setting up a second connection between the control device and the memory device; after an end of call set up, transmitting useful information broadband via the first connection; and after an end of call set up, transmitting control information narrowband over the second connection. Preferably, the step of transmitting further useful information which differs from the useful information narrowband via the second connection is provided.

The step of exchanging information transmits information according to asynchronous transfer mode principles, in one embodiment.

The method calls for indirectly addressing the memory using the control devices for call setup.

Implementing a time-dependent and volume-dependent charge calculation during a time span of an existence of said at least one connection is also possible according to the invention.

A circuit arrangement for connection control for interactive services has a plurality of control devices; a terminal equipment to which each of the plurality of control devices is allocated; at least one memory device; a network node operating to provide a through connection of information, the network node being connected to the plurality of control devices and to the at least one memory device, the network node conducting information from the at least one memory device to each of the plurality of control devices and vice versa using an existing connection; the plurality of control devices and the at least one memory being operable for automatic call setup from one of the control devices using a real-time signalling method to exchange information for a duration of the at least one connection; and a majority of the control devices and the at least one memory device and the network node being network elements of intelligent networks.

A circuit arrangement of the preferred embodiment provides that the control devices are integrated into the terminal equipment.

It is provided that two connections are set up between one of the control devices and one of the memory devices, whereby, after the end of the call setup, the useful information are transmitted broadband via the one of these connections and the control information are transmitted narrowband via the other. This provides the advantage that the signals of standard coding methods for audio/video signals such as, for example, signals according to the MPEG standard can be transmitted between the two devices.

It is provided that the information are transmitted between one of the control devices and the respective memory device according to a transmission method that functions according to an asynchronous transfer mode. This provides the advantage that the transmission of the video signals can be implemented broadband from the appertaining memory device to the subscriber.

It is provided that the respective memory device is indirectly addressed by the respective control device for the purpose of the call setup. This involves the advantage that an identification of the subscriber cannot be carried out by the provider of the video services. It is also possible to thus switch the connection in a way that is dependent on locale, date and/or time of day.

It is provided that a time-dependent, volume-dependent and, potentially, content-dependent charge calculation is implemented for the time span of the existence of the connection. This provides the advantage that the network resources can be efficiently utilized. Further, the network operator can prepare a bill for the respective subscriber in view of, for example, time, the volume/bandwidth and the content of the connection by supplying the content-dependent charge information provided by the operator of the memory means.

It is provided that useful information deviating from useful information are transmitted narrowband via the other of these connections. This provides the advantage that no broadband connection is occupied for the transmission of text, simple graphics and the like.

It is particularly provided that the control devices, the memory devices as well as the network nodes satisfy the demands for network elements of intelligent networks. This provides the advantage that the services realized in the intelligent networks can be co-utilized.

It is provided that the respective control device is integrated in the respectively allocated terminal equipment. The advantage is thus provided that new terminal equipment such as, for example, television sets can be integrated with little problem into this concept.

BRIEF DESCRIPTION OF THE DRAWINGS

The invention shall be set forth in greater detail below with reference to an exemplary embodiment as shown in the accompanying drawings.

FIG. 1 is a schematic block diagram of an arrangement with which the present method is executed; and FIG. 2 is a diagram showing the inventive method on the basis of a signalling procedure as used in the call setup in intelligent networks.

DETAILED DESCRIPTION OF THE PREFERRED EMBODIMENTS

FIG. 1 shows an arrangement according to the concept of intelligent networks IN. A network node SSP is shown therein. In the present exemplary embodiment, the information are delivered to the individual terminal equipment according to the known ATM transmission method; for this reason, the network node SSP is fashioned as an ATM network node ATMN. Further equipment of the ATM network ATMN are connected to the network node SSP. Further, it is connected to ISDN local exchanges LE. A memory means SP is likewise connected to the network node SSP. In the present exemplary embodiment, it is fashioned as a video server that delivers the content provider function CP. Only one content provider CP is addressed in the exemplary embodiment even though a plurality thereof can be present at the network node SSP as well as at other network nodes. Further, an access means FCLT which is an access network is connected to the network node SSP. Via the access means FCLT, the information to be transmitted are supplied to a network terminating means NTA via an optical fiber/coaxial cable network FCN, whereby signals for conventional cable television CATV are fed into the access means FCLT. A television set TV or, respectively, an infrared manual control IR is connected to the network terminating means NTA via a control device fashioned as a set top box STB. Further, broadband or, respectively, narrowband devices for ISDN subscribers are connected to the network terminating means NTA, whereby broadband subscribers can also be directly brought to the network node SSP.

The inventive method performed on an arrangement of FIG. 1 shall be set forth in greater detail below. Inventively, a call setup is to be implemented from a set top box STB to a content provider CP. A known real-time signalling method is employed for that purpose. The call setup is started by an external control signal. This is supplied to the set top box STB by a subscriber via an infrared manual control IR. Depending on this external control signal, the connection is now produced according to the standardized real-time signalling method.

First, a first connection C is set up, this being in the position to transmit narrowband control information. What are thereby involved, for example, are control information for menu selection. When the corresponding selection request is confirmed via this control connection C, then a broadband useful connection U is set up via which the content provider CP transmits the selected film to the television set TV in the form of video signals. The video signals are transmitted broadband via this useful connection U. When there is no further desire on the part of the subscriber to view the video film, both connections are cleared down. A time-dependent charge calculation is implemented for the duration of the existence of the connection. The link into the intelligent network IN has the advantage that the higher services realized therein can also be co-utilized. Thus, for example, a video film can be selected and paid for with a credit card (also termed CREDIT CARD CALLING). Further, it is particularly the call-in of video films that is addressed in the exemplary embodiment. The invention, however, is not limited only to this service. Thus, all services that a content provider CP offers at an arbitrary location of the network can be called. The use of the broadband useful connection U for the transmission of the useful information is also not compulsory. When, for example, a character-oriented presentation as known, for example, from video text is to be shown on the television set TV, the control connection C can likewise be co-employed for the transmission of these information.

FIG. 2 shows the corresponding conditions during the call setup within the intelligent network SSP. This comprises a network node SSP as well as a computer SCP, whereby the latter is to be referred to as service control point according to the definition of intelligent networks. The network node SSP has a circuit switching function, assists in the charge calculation and triggers the network IN services, whereas the computer SCP is responsible for controlling the intelligent network IN services. Based on the criterion of the external control signal, a connection is thus to be set up first to some content provider CP or other. To this end, a SETUP command is forwarded to the network node SSP. This is accompanied by additional information in the form of an identifier, whereby the identifier is composed of the parameters IN# (CP) and Bw(C). The parameter IN#(CP) denotes that an interactive video service is requested, whereas the parameter Bw(C) signals what bandwidth is needed for the control connection C. These information are interpreted in the network node SSP and a parameter LSR is queried to the computer SCP with a further command QUERY. The direct addressing proceeding from the set top box STB to the content provider CP is thus interrupted. The network node SSP is informed of the parameters #(CPc) and LSR by the computer SCP with an acknowledge command RESP. The allocation of the appertaining control connection to the appertaining useful connection are enabled particularly on the basis of the parameter LSR. Second, the real network address of the addressed content provider CP is contained in the parameter #(CPc). The corresponding calculations were implemented in the computer SCP and are also stored in the computer. These information are interpreted in the network node SSP and are partially converted. In particular, the information is taken from the parameter LSR that allows an identification of the subscriber initiating the call setup on the part of the content provider CP and the information that have thus arisen are attached to a parameter ADDR.

The addressing to the content provider CP shall be continued below in that a SETUP command is supplied to the content provider CP from the network node SSP. As parameters, the parameter #(CPc), the parameters Bw(C) and the parameter ADDR are co-supplied. In particular, it is thus not possible for the service provider who offers his information in the content provider CP to identify the calling subscriber represented by the control means STB. The allocation is known only to the network operator via the access in the computer SCP. The narrowband control connection C is set up after the reception of the SETUP command by the content provider CP.

First, information are exchanged between the set top box STB and the content provider CP via the control connection C. For example, the parameters ADDR(CPu), Bw(U) and LSR are transferred. Following thereupon, the control data needed for the menu control, for example, are exchanged. When the desired video film has been selected and marked, this is followed by the set up of the broadband connection via which the video signals are then transmitted. To this end, a further SETUP command is forwarded to the network node SSP by the set top box STB. As an identifier, the parameters #(CPu), Bw(U) and ADDR(LSR) are taken along. The parameter Bw(U) thereby contains the bandwidth for the video signals to be transmitted. Following thereupon, a time-dependent charge calculation is initiated by the network node SSP with the assistance of a START_AMA (LSR) command forwarded to the computer SCP. Simultaneously therewith, the SETUP command is forwarded to the content provider CP, whereupon the setup of the broadband useful connection U is implemented. The video signals are then transmitted thereover to the television set TV of the subscriber.

When the selected video film has ended or when there is no request for another video film, then the set top box STB first clears down the useful connection U and then the control connection C. This ensues in that, first, a command RELEASE(u) is forwarded to the network node SSP. This command is then forwarded to the content provider CP. Parallel thereto, the time-dependent charge calculation is stopped in that the computer SCP is provided with the command STOP_AMA(LSR). The broadband useful connection U is cleared down when the content provider CP has received the command RELEASE(u). The narrowband control connection C still remains. The latter is cleared down in that a command RELEASE(c) is provided to the network node SSP and to the content provider CP. The connection has thus been ended.

Although other modifications and changes may be suggested by those skilled in the art, it is the intention of the inventors to embody within the patent warranted hereon all changes and modifications as reasonably and properly come within the scope of their contribution to the art.

We claim:

1. A method for connection control for interactive services that include a plurality of control devices, each of which is allocated to a terminal equipment, and a network node serving for through connection of information and to which a plurality of control devices and at least one memory device is connected, and via which information is conducted from the memory device to one of the control devices and vice versa using an existing connection, comprising the steps of:

automatically setting up a first connection from one of the control devices to the memory device using a standardized real time delivery method, said first connection being capable of broadband transmission;

setting up a second connection from said one control device to said memory device, said second connection being capable of narrow band transmission; and exchanging broadband information over said first connection and exchanging narrow band information over said second connection for a duration of existence of said first and second connections.

2. A method as claimed in claim 1, wherein said narrow band information being exchanged over said second connection in said exchanging step is control information.

3. A method as claimed in claim 1, wherein said broadband information being transmitted over said first connection in said exchanging step is useful information.

4. A method as claimed in claim 1, wherein said first connection is capable of transmitting video on demand data as said broadband information, said broadband information being transmitted after an end of call set up via said first connection; and said narrow band information being transmitted after an end of call set up over said second connection.

5. A method as claimed in claim 3, further comprising the steps of:

transmitting further useful information which differs from said useful information narrowband via said second connection.

6. A method as claimed in claim 1, wherein said step of exchanging information transmits information according to asynchronous transfer mode principles.

7. A method as claimed in claim 1, further comprising the step of:

indirectly addressing said memory using said control devices for call setup.

8. A method as claimed in claim 1, further comprising the step of:

implementing a time-dependent and volume-dependent charge calculation during a time span of an existence of said at least one connection.

9. A circuit arrangement for connection control for interactive services, comprising:

an intelligent network including:

a plurality of control devices;

a terminal equipment to which each of said plurality of control devices is allocated;

at least one memory device;

a network node operating to provide a through connection of information, said network node being connected to said plurality of control devices and to said at least one memory device, said network node conducting information from said at least one memory device to each of said plurality of control devices and vice versa using an existing connection;

said plurality of control devices and said at least one memory being operable for automatic call setup from one of said control devices.

10. A circuit arrangement according to claim 9, wherein said control devices are integrated into terminal equipment.

* * * * *